United States Patent
Watkins, Jr. et al.

(10) Patent No.: US 8,579,710 B2
(45) Date of Patent: Nov. 12, 2013

(54) SYSTEMS AND METHODS OF VIRTUAL GOODS TRADING USING RATINGS TO ASCRIBE VALUE TO VIRTUAL GOODS

(75) Inventors: Oliver (Lake) Watkins, Jr., Toronto (CA); Yousuf Chowdhary, Maple (CA); Jeffrey Brunet, Richmond Hill (CA); Ravinder ("Ray") Sharma, Richmond Hill (CA)

(73) Assignee: XMG Studio, Inc. (CA)

( * ) Notice: Subject to any disclaimer, the term of this patent is extended or adjusted under 35 U.S.C. 154(b) by 0 days.

(21) Appl. No.: 13/353,025

(22) Filed: Jan. 18, 2012

(65) Prior Publication Data

US 2012/0231891 A1 Sep. 13, 2012

Related U.S. Application Data

(60) Provisional application No. 61/461,480, filed on Jan. 20, 2011.

(51) Int. Cl.
*A63F 9/24* (2006.01)

(52) U.S. Cl.
USPC .............................. 463/42; 705/7.35; 705/400

(58) Field of Classification Search
USPC .................................... 705/400, 7.35; 463/42
See application file for complete search history.

(56) References Cited

U.S. PATENT DOCUMENTS

| | | | |
|---|---|---|---|
| 6,009,458 A | 12/1999 | Hawkins et al. | |
| 2008/0059384 A1* | 3/2008 | Eglen et al. | 705/400 |
| 2008/0154798 A1* | 6/2008 | Valz | 705/400 |
| 2009/0265636 A1* | 10/2009 | Ruiz-Velasco et al. | 715/738 |
| 2010/0042577 A1* | 2/2010 | Rinearson | 706/56 |
| 2010/0114739 A1* | 5/2010 | Johnston | 705/27 |
| 2010/0175002 A1* | 7/2010 | Cannon et al. | 715/757 |
| 2011/0302052 A1* | 12/2011 | Giese et al. | 705/26.25 |

OTHER PUBLICATIONS

Dean, Amanda. Forum Post of the Day: Broken records incoming [online]. Aug. 12, 2008 [retrieved on Dec. 21, 2012]. Retrieved from the internet: <URL: http:// wow.joystiq.com/2008/08/12/forum-post-of-the-day-broken-records-incoming/>.

* cited by examiner

*Primary Examiner* — Sunit Pandya
*Assistant Examiner* — Steve Rowland

(57) ABSTRACT

A method is provided for trading virtual goods. A game environment is provided in which a first player can acquire or develop a virtual good. This virtual good has a starting value. At least one rating of the virtual good is received from a second player via the game environment. The starting value is automatically increased or decreased as a function of the at least one rating of the virtual good. The virtual good is then made available for purchase at the new value. A system for trading virtual goods is also provided.

24 Claims, 5 Drawing Sheets

| Virtual Good Name: | Magical Sword |
|---|---|
| Initial Value | $1.00 |
| Current Value | $1.00 |
| | Rating |
| | |
| Average Rating | 0 |

FIG. 4

| | |
|---|---|
| Virtual Good Name: | Magical Sword |
| Base (Initial) Price | $1.00 |
| Current Price | $1.50 |
| | New Ratings |
| Player1 | 5 |
| Player2 | 2 |
| Player3 | -1 |
| Average (Current) Rating | 2 |
| Initial Rating | 0 |

FIG. 5

SYSTEMS AND METHODS OF VIRTUAL GOODS TRADING USING RATINGS TO ASCRIBE VALUE TO VIRTUAL GOODS

FIELD OF INVENTION

The present invention is related to video game applications in general and trading of virtual goods in video game applications in particular.

BACKGROUND

A virtual world is a computer simulated environment. A virtual world may resemble the real world, with real world rules such as physical rules of gravity, geography, topography, and locomotion. A virtual world may also incorporate rules for social and economic interactions between virtual characters. Players (users) may be represented as avatars, two or three-dimensional graphical representations. Virtual worlds may be used for massively multiple online role-playing games, for social or business networking, or for participation in imaginary social universes.

Virtual goods are non-physical objects purchased for use in virtual worlds, online communities or online games. Virtual goods trading which may include buying and/or selling digital gifts, digital clothing for avatars, tokens etc. is a growing market. Social gaming is another market segment that is growing fast and one of its integral components is branded virtual goods market.

Thus in general the virtual goods trading market is growing as people become more used to the ideas of trading online and playing games on non-traditional portable terminals e.g. iPhone, iPad, Smartphones etc.

Prior art virtual worlds where virtual goods are traded are designed such that the seller assigns a value to a virtual good in an electronic transaction. The seller of a virtual good may be an online company or a brand (in case of the branded virtual goods) or a person who owns or has the rights to trade the virtual good. Thus prior art virtual worlds lack the ability to take other factors into account for ascribing value to virtual goods. Our invention overcomes these limitations of the prior art and provides a unique method and a system for virtual goods trading.

SUMMARY OF THE INVENTION

Almost every major online game (virtual world) has an in-game economy, where players exchange in-game virtual goods for in-game currency. Most virtual worlds also have a real-world economy, where in-game currency and virtual goods are traded for real-world cash.

This application describes systems and methods for virtual worlds whereby the player ratings for a virtual good are used for ascribing value to the virtual good. For example if a player has rated a virtual good higher than a higher value is ascribed to the virtual good. Thus as more players rate the virtual good, its ascribed value changes based on the ratings i.e. higher ratings tend to ascribed a higher sale price to a virtual good, while lower ratings would tend to lower the sale price of the same virtual good.

Using the methods and systems disclosed in this application, ratings given by players are used for ascribing value to virtual goods. This may also apply to other digital goods, for example the real time price of an iPhone game may change based on the ratings provided by the players. This provides for a richer gaming experience and increases player engagement while making the gameplay of the virtual world more involved. The systems and methods described here enable a player to have a unique and more enjoyable gaming experience.

According to a first aspect of the invention, a method is provided for trading virtual goods. A game environment is provided in which a first player can acquire or develop a virtual good. This virtual good has a starting value. At least one rating of the virtual good is received from a second player via the game environment. (This is stored on a storage means in communication with the game environment.) The starting value is automatically increased or decreased as a function of the at least one rating of the virtual good. The new value is stored on the storage means. The virtual good is then made available for purchase at the new value retrieved from the storage means.

The starting value may be set by the first player who developed or acquired the virtual good, or the starting value may be preset (e.g. a default value).

Upon receiving a request from a requesting player to purchase the virtual good, the method may include checking whether the requesting player previously rated the virtual good. This checking may be used for various anti-fraud or anti-collusion safeguards. For example, the sale may only proceed if the requesting player did not previously rate the virtual good (or the requesting player did not previously rate the virtual good negatively).

Multiple ratings can be compiled before automatically increasing or decreasing the starting value. These may be averaged, or some other method of compiling the ratings may be used. Further, outlying ratings may be stripped before averaging, or other weighting factors may be used. For example, calculation of the new value may include factoring in the overall number of ratings (either of the virtual good, or all virtual goods in the game environment). Calculation of the new value may also include factoring in the number of ratings as compared with the number of players, or the number of users or viewers of the virtual good. Further, calculation of the new value may include factoring in the relative experience or trustworthiness of the second player (i.e. the rater).

Ratings may be received in various ways. In one variation, a rating is automatically assessed based on use of the virtual good by the second player in gameplay. Users may also be prompted to rate the virtual good in the course of gameplay.

The starting value and the new value may be expressed in a game currency or real world currency.

According to a second aspect of the invention, a system is provided for trading virtual goods in a game environment. The system includes a game engine and a storage means.

The game engine is programmed for: providing a game environment accessible by a plurality of players, including a facility by which a first player can acquire or develop a virtual good, the virtual good having a starting value; receiving via the game environment at least one rating of the virtual good from a second player; automatically increasing or decreasing the starting value as a function of the at least one rating of the virtual good; and making the virtual good available for purchase at the new value.

The storage means (which is in communication with the game engine) stores the starting value, the at least one rating and the new value.

In one embodiment, the game engine is provided by a central game server.

The game engine may be a software program stored on or accessible to a game console.

Various types of storage are possible. The storage means may be provided by one or a combination of: a local fixed memory, a local removable memory, a remote fixed memory, a remote removable memory, and a virtual memory. Preferably, the storage means is co-located with the central game server.

The game engine may check for new ratings at predetermined intervals. It may also compile the new ratings and calculate the new value of the virtual good at predetermined intervals. It may also make the virtual good available at the new value at predetermined intervals (i.e. release the new value to users). Alternatively, the game engine may receive new ratings substantially instantaneously. The value of the virtual good may be automatically increased or decreased upon receipt of each new rating.

BRIEF DESCRIPTION OF THE FIGURES

FIGS. 4-5 are tables showing the effect of ratings in one possible (simple) embodiment where ratings are averaged and used to create a new price (value).

DETAILED DESCRIPTION

Figure 1:
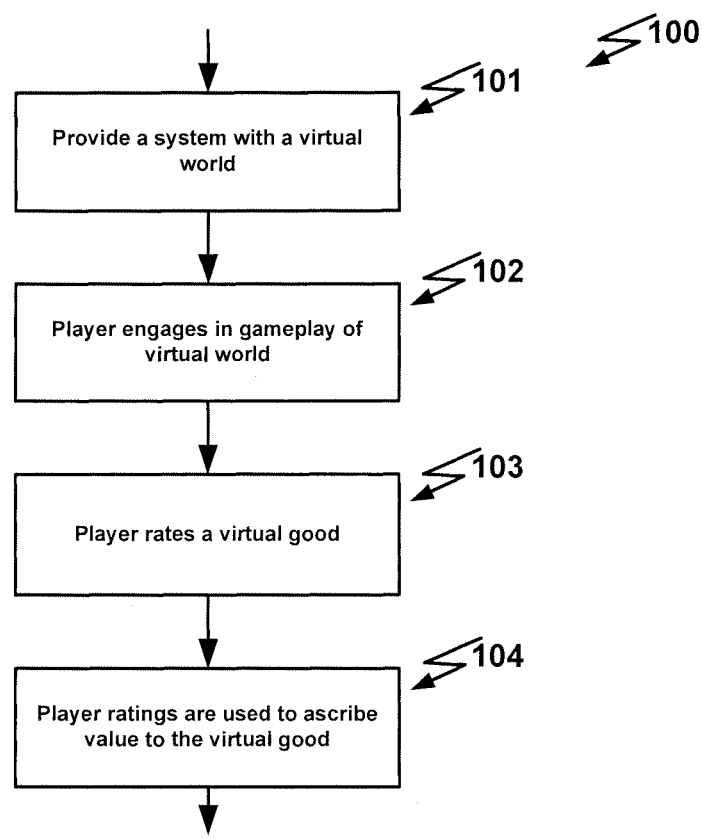
FIG. 1 is a flow diagram of the method according to a preferred embodiment.

Methods and arrangements for ascribing value to virtual goods in gaming applications and virtual worlds based on player ratings are disclosed in this application.

Before embodiments of the invention are explained in detail, it is to be understood that the invention is not limited in its application to the details of the examples set forth in the present description or drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable or readable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A "virtual world" as used herein need not be a "game" in the traditional sense of a competition in which a winner and/or loser is determined, but rather that the term "game" incorporates the idea of a virtual world. Moreover, a person or entity who enters the virtual world in order to conduct business, tour the virtual world, or simply interact with others or the virtual environment, with or without competing against another person or entity is still considered to be "playing a game" or engaging in the gameplay of the game.

Virtual worlds can exist on game consoles for example Microsoft Xbox, and Sony Playstation, Nintendo Wii, etc., or on online servers, or on mobile devices (e.g. an iPhone or an iPad), Smartphones, portable game consoles like the Nintendo 3DS, or on a PC (personal computer) running MS Windows, or MacOS, Linux or another operating system. This list is not exhaustive but is exemplary of devices or computing environments where virtual worlds can exist, many other variations are available and known to persons skilled in the art.

A computer or a game console can be used to enable a user to engage with a virtual world, including a memory for storing a control program and data, and a processor (CPU) for executing the control program and for managing the data, which includes user data resident in the memory including a set of gameplay statistics. The computer, or a game console, may be coupled to a video display such as a television, monitor, or other type of visual display while other devices may have it incorporated in them (iPad). A game or other simulations may be stored on a storage media such as a DVD, a CD, flash memory, USB memory or other type of memory media. The storage media can be inserted to the console where it is read. The console can then read program instructions stored on the storage media and present a game interface to the user.

Typically, a user or a player manipulates a game controller to generate commands to control and interact with the virtual world. The game controller may include conventional controls, for example, control input devices such as joysticks, buttons and the like. Using the controller a user can interact with the game, such as by using buttons, joysticks, and movements of the controller and the like. This interaction or command may be detected and captured in the game console. The user's inputs can be saved, along with the game data to record the game play. In one embodiment, the gameplay data can include usage statistics captured to record the user's experience as they progress from one level of the game to the next.

The term "player" is intended to describe any entity that accesses the virtual world, regardless of whether or not the player intends to or is capable of competing against other players. Typically, a player will register an account with the game console within a peer-to-peer game and may choose from a list or create virtual characters that can interact with other virtual characters of the virtual world.

The term "engage in gameplay" generally implies playing a game whether it is for the purpose of competing, beating, or engaging with other players. It also means to enter a virtual world in order to conduct business, tour a virtual world, or simply interact with others or a virtual environment, with or without competing against another entity.

Virtual goods may include virtual money, experience points, weapons, points, vehicles, credentials, permissions and virtual gold. A player's online persona may obtain these virtual goods via game-play, purchase or other mechanisms. For example, as a player of a first person shooter completes various levels of the game, he obtains additional weapons, armor, outfits, experience points and permissions. Additional weapons and armor which may be beneficial in facilitating the completion of levels and allowing the player to perform in new and different ways may be acquired (i.e. purchased). Additional permissions may unlock additional levels of the game or provide access to an otherwise hidden forum or stage. Whatever the items, players of massively-multiplayer online games (MMOGs) are constantly in search of virtual goods so as to enrich their game experience A virtual good may comprise any one of a virtual character of an online game, an object of an online game, a weapon of an online game, a vehicle of an online game, virtual currency of an online game, experience points of an online game and permissions of an online game etc. A virtual good may further be any item or object that exists only in a virtual world (game), such virtual good may be obtained through playing an online game, purchasing the virtual good in the online game or receiving the virtual good from another player of the virtual world e.g. an online game.

In some scenarios, virtual goods may be classified as services instead of goods. To illustrate this let's look at a simple example of a virtual world that allows its players to create and design costumes for their virtual characters by providing tools for so doing. First player chooses to spend an hour of her time designing a swimsuit for dressing up a virtual character, while second player instead chooses to visit the virtual mall in the virtual world and uses real world currency to buy a swimsuit for her virtual character.

For the purpose of this application a seller of a virtual good is defined as a person or an entity selling the virtual good. While a buyer of a virtual good is a person or entity acquiring the virtual good from the seller by paying a suitable currency that is mutually agreeable to both the seller and the buyer.

Each virtual world may incorporate a mediating trading system. The virtual world (game system itself) may itself be a buyer or a seller of virtual goods or the virtual world may act as a mediating entity to facilitate the transaction between the buyer and the seller. For example, the virtual world may be set up such that player created content is exchanged for rewards/points (so that the virtual world is in effect a "buyer" of the virtual goods). The virtual world may then "sell" this player created content to other players for rewards/points (or other game or real-world currency).

A "virtual character" may include a persona created by a player or chosen from a list in the virtual world. Typically virtual characters are modeled after the humans whether living or fantasy (e.g. characters from mythology).

A virtual character is represented by one or more gameplay statistics, which encapsulate some meaning to connect the virtual (and digital) reality of the game to the real world. Many of these statistics are not apparent to the user as such, but are instead encoded within the framework of the game or composed together to form a script. In role-playing games (RPGs) and similar games, these statistics may be explicitly exposed to the user through a special interface, often with added meaning which provides context for the user's actions.

In virtual worlds (video/computer games) a "non-player character" (NPC) is a virtual character that is controlled by the program and not a player. NPC may also refer to other entities not under the direct control of players. NPC behavior in a virtual world may be scripted and automatic.

A "player character" or "playable character" (PC) is a virtual character in a virtual world that is controlled or controllable by a player. A player character is a persona of the player who controls it. In some cases, a virtual world has only one player character and in other cases there may be a small number of player characters from which a player may pick a certain virtual character that may suit his or her style of gameplay, while in other scenarios there may be a large number of customizable player characters available from which a player may choose a virtual character of their liking. An "avatar" may include the physical embodiment of a virtual character in the virtual world.

The intent is to cover all such areas where the value can be ascribed based in player ratings. Some of these terms are explained in more detail below.

A "statistic" (stat) in role-playing games (RPG) is a datum which represents a particular aspect of a virtual character. Most virtual worlds separate statistics into several categories. The set of categories actually used in a game system, as well as the precise statistics within each category may vary greatly from one virtual world to another. Many virtual worlds also use derived statistics whose values depend on other statistics, which are known as primary or basic statistics. Derived statistics often represent a single capability of the character such as the weight a character can lift, or the speed at which they can move. Derived statistics are often used during combat, can be unitless numbers, or may use real-world units of measurement such as kilograms or meters per second.

A virtual character's statistics affects how it behaves in a virtual world. For example, a well-built muscular virtual character may be more powerful and be able to throw certain virtual objects farther, but at the same time may lack dexterity when maneuvering intricate virtual objects. A virtual character may have any combination of statistics, but these statistics may be limited by either a hard counter, soft counter or a combination of both.

Most devices where virtual worlds exist provide a mechanism to save the state of the game, so that the game can be played from the same point where it was left off. Methods for saving the state of the game include but are not limited to the examples cited here, for example a gaming console may provide internal memory chips, or a port where a user can connect user supplied memory; while games played over the Internet may provide online memory. The aforementioned memory space can also be used for saving the different components of the storyline that are affected by the change in the real world location of the player to enhance the gameplay experience.

FIG. 1 shows a flow diagram of a simplistic concept of the method. A virtual world is provided by the system 101. The virtual world may be a single player game or a multiplayer game or a MMORPG (Massively Multiplayer Online Role Playing Game) and may exist on any type of a gaming device which may include but not limited to an iPhone, iPad, Smartphones, Android phones, personal computers e.g. laptops, gaming consoles like Nintendo Wii, Nintendo DS, Sony PlayStation, Microsoft Xbox 360, and online server based games etc.

The computer program comprises: a computer usable medium having computer usable (or readable) program code, the computer usable (or readable) program code comprises:

computer usable program code for presenting graphically to the player the different options available to rate and trade virtual goods.

As the player engages in gameplay of the virtual world 102, the player may encounter or develop virtual goods. As mentioned earlier, the term "engage in gameplay" generally implies playing a game whether it is for the purpose of competing, beating, or engaging with other players. It also means to enter a virtual world in order to conduct business, tour a virtual world, or simply interact with others or a virtual environment, with or without competing against another entity.

Players have the opportunity to rate a virtual good 103. The system may provide a user interface (or facility) that receives the player's rating of the virtual good. In one embodiment of the invention, the player may be only allowed to rate a virtual good after it has been purchased.

Player ratings are used to ascribe a value to the virtual good 104. Thus as more ratings are received, the ascribed value of the virtual good may go up or down based on the ratings provided by the players of the virtual world.

A player may rate a virtual good higher due to a number of reasons; for example a player may like the aesthetics of a virtual attire and may rate it accordingly, a player may find a virtual good e.g. a special gun, to be more useful in combat in a virtual world and may then rate the gun higher. Similarly a player may rate a virtual good lower if they do not like the virtual good, or the effectiveness of the virtual good is lower in a certain virtual world. Thus the rating provided by the player impacts the changes to the value of the virtual goods and as more players rate the virtual good the price adjusts to reflect these ratings.

In order to mitigate the possibility of players banding together to rate a virtual good negatively to lower its value, so that they can purchase it after its value has gone down, the system may only allow players to rate a particular virtual good after they have purchased the same virtual good.

Alternatively, if a player rates a virtual good negatively then the player is not allowed to buy the virtual good at the new lowered price. Further, if player rates a virtual good positively and the value of the virtual good goes up then the player may be prevented from selling the virtual good at the new higher value.

Figure 2:
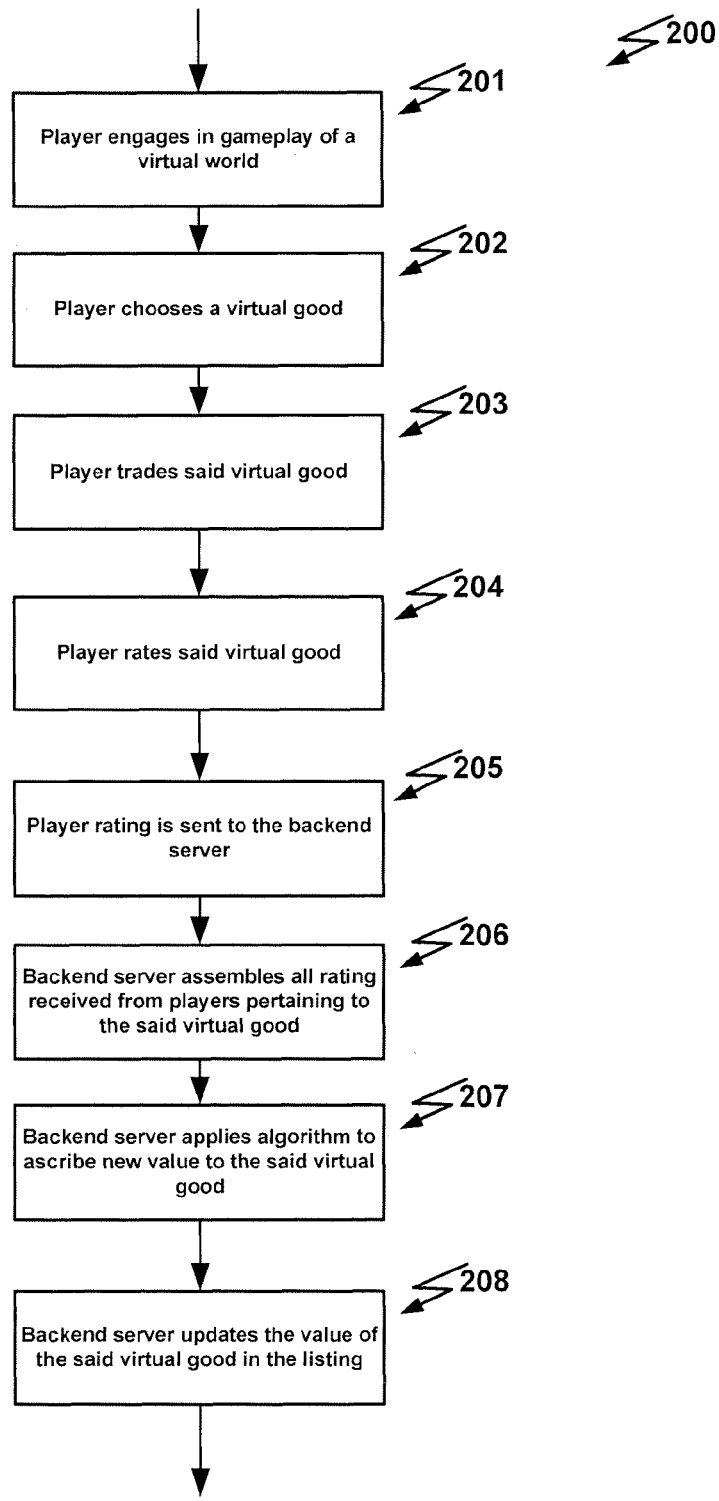
FIG. 2 is a flow diagram illustrating a possible method using a backend server.
Figure 3:
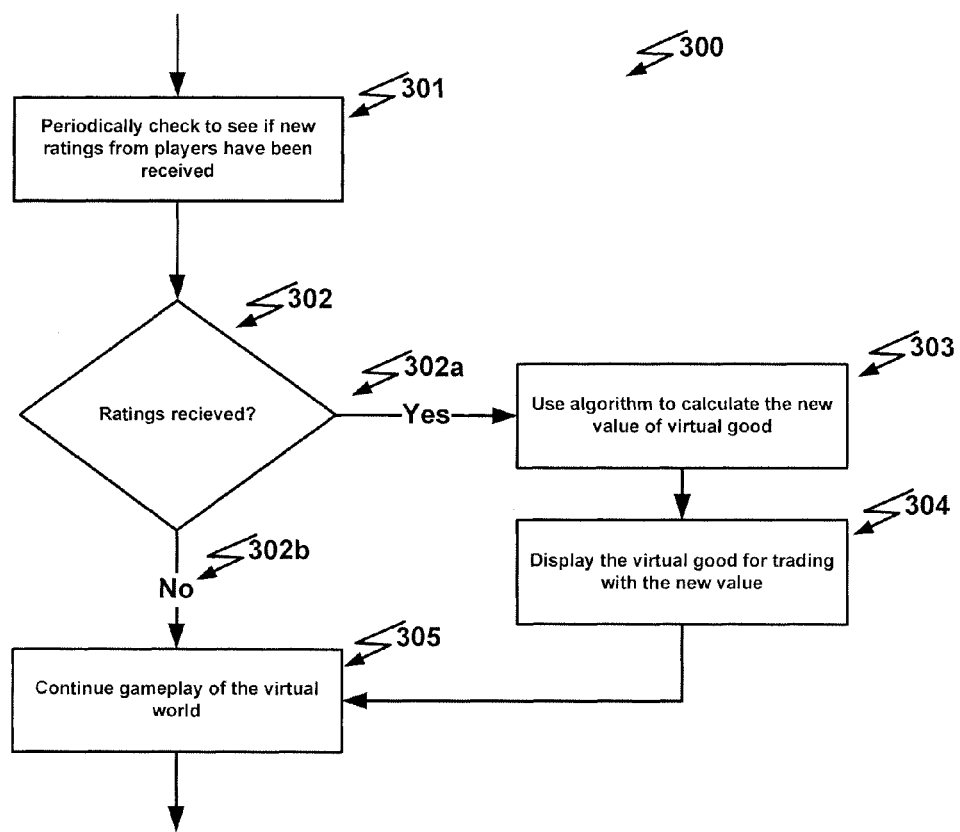
FIG. 3 is a flow diagram of periodic checking to see if new ratings are received.

FIG. 2 shows one embodiment of the invention. The player engages in gameplay of a virtual world 201, and then chooses a virtual good 202. There may be a user interface for facilitating the player in choosing a virtual good, e.g. a list of all virtual goods available in the virtual world or a list that is relevant to the particular level etc. Other virtual places where a player may browse and choose virtual goods may be a virtual shop, a virtual mall, a list of items for sale by another player, a list of virtual goods for sale in the entire virtual world. In another scenario, the virtual good may also be purchased outside of a first virtual world, and once acquired can be imported into the first virtual world by the player.

Player then trades the virtual good 203. Trade can mean buy, sell or barter. The player may use in-game currency or real world currency or may use other virtual goods to barter for the virtual good.

Ratings are received from players related to the virtual good 204. The system may offer a user interface for rating virtual goods. The actual rating of the virtual good may be based on a star rating (say 3 stars out of 5 stars), or rating may be a percentage (for example 75% rating) or a points based rating (e.g. 3.5 out of 5, or 8 out of 10) or other such method known to persons skilled in the art.

These player ratings may be sent to a back-end server over a network e.g. over the Internet, or LAN or 205. The ratings may be sent either immediately after the player has rated a virtual good, periodically, e.g. every few hours, or once a day or when a connection to the back-end server is available. An example of the last situation is an instance of a player engaged in the gameplay of a virtual world while riding a subway train where no cellular data coverage is available; thus if the player rates a virtual good, the rating is cached and uploaded to the back-end server as soon as the player arrives at a place where there is coverage and connection to the back-end server can be established.

The back-end server can then assemble all of the ratings received from all players pertaining to the virtual good 206. Thus a back-end server may assemble all player provided rating instantaneously as soon as a new rating is received, or may so do at periodic time intervals e.g. once an hour, or once a day.

The server applies an algorithm based on ratings to ascribe a new value to the virtual good 207. There may be several algorithms that can be used for calculating and ascribing a new value of the virtual good. Some simple examples are discussed below.

The value of the virtual good is then updated in the listing reflecting the new value 208. A back-end server may update the ascribed value of a virtual good instantaneously as soon as a new rating is received, or may so do at periodic time intervals e.g. once an hour, or once a day.

Let's look at some examples. In one example, a console based (single player) game is provided. In the game, the user can buy virtual goods from a server. Virtual goods are downloadable from the server and made available for players. As each player purchases and rates each virtual good, the ratings are sent to the server so that a new in-game value for that virtual good may be calculated. As these virtual goods are downloaded and made available (either through live streaming, product updates, or other methods) other players may purchase them at this newly calculated value.

Another example is a server based game (this can be a single player game, a multiplayer game or a massively multiplayer game) with virtual goods traded on the server. Virtual goods are stored on the server and made available to players logged into that server. As each player purchases and rates each virtual good, the ratings are retained by the server so that a new in-game value for that virtual good may be calculated. As these virtual goods are introduced on the server and made available (either through live streaming, page refreshes, or other methods) other players may purchase them at this newly calculated value.

Note that in each example, the newly calculated value may in turn prompt a change in rating, purchasing behavior, or other factors important to gameplay and monetization. For example, the feedback loop of ratings and value shifts of the virtual goods may be affected by perceptions of usability, accessibility, aesthetics and effectiveness (e.g. if everyone has the same weapon, its perceived "exclusiveness" or "specialness" may decrease, and therefore, new users may be inclined to rate it lower, and its value may drop accordingly). Conversely, very high ratings may cause the value of a virtual good to go so high that it becomes effectively out of reach for most players. Perceptions of the virtual good may be affected if few players can afford the virtual good.

The system may periodically check to see if new ratings from players have been received 301. For example a checking process may run periodically at some pre-set interval (e.g. one hour), at which time the player ratings are added to a database table and a new average rating is calculated. Other example of periodic updates of the ratings, and periodic updates to the ascribed value based on the player ratings, may be once every month, or once a week, or every 24 hours, or every 15 minutes or immediately after a new rating has been received.

The system checks to see whether new ratings were received for the virtual good 302. If Yes 302a, i.e. new ratings have been received, then the system uses an algorithm to update the value of the virtual good 303. The system may use any number of different algorithms to calculate the ascribed value of the virtual good.

The system displays the virtual good with the new value for trading 304. For example the virtual good may be displayed in a list of virtual goods available for trading in a virtual world.

If no new ratings are received from players 302b then the system allows players to continue the gameplay of the virtual world 305.

A player rating may impact the value of the virtual good positively or negatively. The application is not limited to the cited examples, but the intent is to cover all such areas that may be used in a virtual world to ascribe value based on player ratings in a virtual world.

Several exemplary embodiments/implementations of the invention of ascribing value to the virtual goods based on player ratings are given below. Other methods are possible and contemplated, and the intent is to cover all such scenarios.

The effectiveness of a virtual good may also impact (change) its value. For example if a first player engaged in the gameplay of a virtual world, trades to acquire a weapon (e.g. a gun), the effectiveness of the weapon against enemies can be used to ascribe value to the weapon. Thus if the weapon is well designed and is easier to use, can fire with a certain accuracy such that the player would like to retain such a weapon in his arsenal package, then a larger value can be ascribed to the weapon. Conversely if the weapon is poorly designed and is not easy to use, the value of the weapon may go down.

In the above scenario, the ratings may come from a player or the system. In the first case the players use and rate the virtual good and the ratings are used to calculate the change in value of the virtual good. In a second scenario, the system may monitor the effectiveness of a virtual good and change its value based on how well it is received by the player community and how the use of the virtual good enables a player to achieve the goals of the virtual world, i.e. how instrumental was the virtual good in helping a player complete a level or defeat an enemy etc.

In one embodiment of the invention, there may be a star based ratings e.g. a 5-star rating is considered 100%, a 4-star rating is considered 80% and a 3-star rating is considered 60% etc. and a 2.5 star rating (50%) would be considered a neutral rating, and anything above that would render the value of the virtual good to go up while ratings below 2.5 starts (50%) may render the value of the virtual good to be affected negatively. Thus when a player rates a virtual good with 3-stars the value of the virtual good goes up (3-star=60%), while a 2-star rating given to a virtual good brings its value down (2-star=40%).

In an alternate embodiment the player may opt to provide a percentage to reflect the above. In another embodiment there may be a points-based rating where positive and negative integers are used, with zero points meaning a neutral rating while positive integer ratings increase the ascribed value while negative integer ratings decrease the ascribed value of the virtual good.

In one exemplary embodiment of the invention, the player provided ratings of a virtual good may be stored in a database table with an average calculated (e.g. the average being the sum of all ratings divided by the number of ratings).

Take the example of a "magical sword" that is created by a player. The player has valued it at $1.00. Assume that the rating system is based on or numerical rating, where 5 is the highest rating, zero is neutral rating and −5 is the lowest rating that a player can provide to a virtual good. The player ratings are stored in a database table (see table in FIG. 4), and initially there are no ratings.

As other players trade (buy) this virtual good, use it and rate it, the database table becomes initially populated, then more ratings are added to the database table, and an average rating is calculated.

As shown in the table in FIG. 5, 3 players, Player1, Player2 and Player3, have rated the virtual good. The average rating of the virtual good is 2 which is derived as follows:

average rating=sum of all ratings/number of ratings thus average rating=(5+2+(−1))/3=6/3=2

Since the initial ratings of the virtual good was zero and the current average rating is 2 thus the ascribed value of the virtual good goes up; i.e. more players like the virtual good and have rated it higher. Specifically, $1.00 was the base price for the virtual good when it had a rating of zero. We can describe the increase in price (value) as a function of the Current (Average) and Initial Ratings:

Current Price=Base Price+(Current Rating−Initial Rating)×$0.25 thus

Current Price=$1.00+(2−0)×$0.25=$1.00+ $0.50=$1.50

This is a simplistic example where a linear equation was used to calculate the new value of the virtual good using player ratings. Below, a more complex example shows how exponential functions can be applied for a specific purpose.

In one embodiment of the invention, virtual goods can be composed of other virtual goods. For example, a gun may be purchased and rated wholesale, or its ammunition, scope, and other pieces may be purchased and rated separately. In cases where a player can customize a virtual good by combining other virtual goods (potentially creating a new, unique virtual good), a different function may be used other than a simple summation of the value of its components (or average of its ratings). Assume that players, by definition, try to maximize the advantages presented to them while minimizing the disadvantages they face. Thus, a more accurate valuation of a composed virtual good would involve multiplying the value of each of its components together.

For example, if an automatic pistol is valued at 10 and a rocket launcher is valued at 20, an automatic rocket launcher should not be in the 30-40 value range, but the 100-200 value range because players will use such a weapon to maximum effectiveness (and it is likely to be an order of magnitude better than the automatic pistol). This more accurate valuation may be the result of an exponential function where each component is multiplied in sequence to determine the final value (automatic=10, pistol ammo=1, rocket ammo=20, so automatic rocket launcher (automatic×rocket ammo)=200). It is also possible to simply base this valuation on the initial rating data provided by players who purchase the composed virtual good, assuming that the rating has a direct correlation with effectiveness. However, this is not always possible due to the limits of the rating scheme (for example, in a 5 star rating scheme, it is not possible for two ratings to be an order of magnitude different), and so it may be necessary to observe the popularity of the virtual good directly or use other statistics. When this is also not possible to do reliably, conservative valuation functions may be necessary to best approximate a virtual good's initial value. The virtual good's value may then fluctuate away from this initial value based on its ratings. At the start, the ratings may take the value in wild swings before settling closer to a "true" value that reflects the broad opinions of the user community (for example, a consensus may develop among the community that an automatic rocket launcher is not necessarily much better than a standard rocket launcher due to a lack of ammo and an increased chance of friendly fire). These factors can only be evaluated organically (through use) by the user community, but an accurate initial valuation is necessary to prevent abuse. The system may accordingly have starting default values for virtual goods based on certain attributes of the virtual goods, so that the value of each virtual good is not solely based on initial creator/user perception. The system may also have certain built-in checks to prevent collusion among raters and buyers.

The number of players who have rated the virtual good and the number of players who could have rated the virtual good may be factors in calculating the ascribed value of the virtual good. For example, the virtual world may have 10,000 players and 100 players have rated the first virtual good; while in another instance of the same virtual world a second virtual good has been rated by 1,000 players. Thus when calculating the ascribed value of the virtual goods, the ratio of the number of players who have rated the virtual good to the number of players who could have rated the virtual good can be taken into account to more accurately calculate the new value (or change in value) of a virtual good.

The above examples are not intended to be limiting, but are illustrative and in fact the system of the invention may use any other algorithm so suited for calculating the ascribed value of a virtual good based on player ratings.

One embodiment of the invention may preferably also provide a framework or an API (Application Programming Interface) for virtual world creation that allows a developer to incorporate the functionality of a impacting the value of a virtual good for trading based on the ratings of the players. Using such a framework or API allows for a more uniform virtual world generation, and eventually allows for more complex and extensive ability to change storyline when a player location changes.

It should be understood that although the term game has been used as an example in this application but in essence the term may also imply any other piece of software code where the embodiments of the invention are incorporated. The software application can be implemented in a standalone configuration or in combination with other software programs and is not limited to any particular operating system or programming paradigm described here. For the sake of simplicity, we singled out game applications for our examples. Similarly we described users of these applications as players. There is no intent to limit the disclosure to game applications or player applications. The terms players and users are considered synonymous and imply the same meaning. Likewise, virtual worlds, games and applications imply the same meaning. Thus, this application intends to cover all applications and user interactions described above and ones obvious to persons skilled in the art.

Although ascribing value to virtual goods in virtual worlds based on player ratings have been exemplified above with reference to gaming, it should be noted that virtual worlds are also associated with many industries and applications. For example, virtual worlds can be used in movies, cartoons, computer simulations, and video simulations, among others. All of these industries and applications would benefit from the disclosed invention.

The examples noted here are for illustrative purposes only and may be extended to other implementation embodiments. While several embodiments are described, there is no intent to limit the disclosure to the embodiment(s) disclosed herein. On the contrary, the intent is to cover all alternatives, modifications, and equivalents obvious to those familiar with the art.

What is claimed is:

1. A method of trading virtual goods on a computing device in communication with a storage medium, comprising:
    providing a video game environment on the computing device, enabling a first player to acquire or develop a virtual good, the virtual good having a starting value;
    storing the starting value on the storage medium;
    receiving, via an input device in communication with the computing device, at least one rating of the virtual good from a second player; and storing the rating on the storage medium;
    increasing or decreasing, using the computing device, the starting value as a function of the at least one rating of the virtual good, and storing a new value representing the increased or decreased starting value on the storage medium;
    providing an interface for making the virtual good available for purchase at the new value retrieved from the storage medium; and
    receiving at the computing device a request from a requesting player to purchase the virtual good, and checking the storage medium for data relating to whether the requesting player previously rated the virtual good prior to allowing a sale of the virtual good to the requesting player.

2. The method of claim 1, wherein the starting value is set by the first player.

3. The method of claim 1, wherein the starting value is a default value.

4. The method of claim 1, further comprising only proceeding with a sale of the virtual good to the requesting player if the requesting player did not previously rate the virtual good.

5. The method of claim 1, further comprising only proceeding with a sale of the virtual good to the requesting player if the requesting player did not previously rate the virtual good negatively.

6. The method of claim 1, wherein the receiving step further comprises compiling multiple ratings before automatically increasing or decreasing the starting value.

7. The method of claim 1, wherein the receiving step further comprises averaging multiple ratings before automatically increasing or decreasing the starting value.

8. The method of claim 1, wherein calculation of the new value includes factoring in a number of ratings.

9. The method of claim 1, wherein calculation of the new value includes factoring in a number of ratings as compared with the number of players, or a number of users or viewers of the virtual good.

10. The method of claim 1, wherein calculation of the new value includes factoring in a relative experience or trustworthiness of the second player.

11. The method of claim 1, wherein the receiving step comprises automatically assessing a rating of the virtual good based on use of the virtual good by the second player in gameplay.

12. The method of claim 1, wherein the receiving step comprises prompting the second player to rate the virtual good in the course of gameplay.

13. The method of claim 1, wherein the starting value and the new value are expressed in a game currency.

14. The method of claim 1, wherein the starting value and the new value are expressed in a real world currency.

15. A computer-implemented system for trading virtual goods on at least one computing device in communication with a storage medium, comprising:
a game engine programmed for:
providing a game environment accessible by a plurality of players, including a facility enabling a first player to acquire or develop a virtual good, the virtual good having a starting value;
receiving via the game environment at least one rating of the virtual good from a second player;
automatically increasing or decreasing the starting value as a function of the at least one rating of the virtual good;
making the virtual good available for purchase at a new value representing the automatically increased or decreased starting value; and
receiving a request from a requesting player to purchase the virtual good, and checking whether the requesting player previously rated the virtual good prior to allowing a sale of the virtual good to the requesting player;
the storage medium in communication with the game engine for:
storing the starting value, the at least one rating and the new value.

16. The system of claim 15, wherein the game engine is provided by a central game server.

17. The system of claim 15, wherein the game engine is a software program stored on or accessible to a game console.

18. The system of claim 15, wherein the storage medium is provided by one or a combination of: a local fixed memory, a local removable memory, a remote fixed memory, a remote removable memory, and a virtual memory.

19. The system of claim 16, wherein the storage medium is co-located with the central game server.

20. The system of claim 15, wherein the game engine checks for new ratings at predetermined intervals.

21. The system of claim 15, wherein the game engine compiles new ratings and calculates the new value at predetermined intervals.

22. The system of claim 15, wherein new values are made available at predetermined intervals.

23. The system of claim 15, wherein the game engine receives new ratings substantially instantaneously.

24. The system of claim 23, wherein the game engine automatically increases or decreases the value of the virtual good upon receipt of each new rating.

\* \* \* \* \*